United States Patent [19]

Jacob et al.

[11] 4,311,678

[45] Jan. 19, 1982

[54] METHOD FOR REMOVING URANIUM-CONTAINING DEPOSITS IN URANIUM HEXAFLUORIDE PROCESSING EQUIPMENT

[75] Inventors: Eberhard Jacob, Feldafing; Walter Bacher, Stutensee-Fr., both of Fed. Rep. of Germany

[73] Assignees: Maschinenfabrik Augsburg-Nurnberg Aktiengesellschaft; Kernforschungszentrum Karlsruhe GmbH, both of Munich, Fed. Rep. of Germany

[21] Appl. No.: 114,506

[22] Filed: Jan. 23, 1980

[30] Foreign Application Priority Data

Jan. 24, 1979 [DE] Fed. Rep. of Germany ....... 2902607
Jul. 30, 1979 [DE] Fed. Rep. of Germany ....... 2930911

[51] Int. Cl.$^3$ ............................................ C01G 43/06
[52] U.S. Cl. .................................. 423/19; 423/258
[58] Field of Search .......................... 423/19, 258

[56] References Cited

U.S. PATENT DOCUMENTS

| | | | |
|---|---|---|---|
| 2,830,873 | 4/1958 | Katz et al. | 423/19 |
| 3,294,493 | 12/1966 | Jonke et al. | 423/19 |
| 3,340,019 | 9/1967 | Pierini et al. | 423/19 |
| 3,925,536 | 12/1975 | Schuman | 423/19 |

FOREIGN PATENT DOCUMENTS 1517638 6/1973 Fed. Rep. of Germany.
2504840 8/1976 Fed. Rep. of Germany.

*Primary Examiner*—Edward A. Miller
*Attorney, Agent, or Firm*—Scully, Scott, Murphy & Presser

[57] ABSTRACT

This invention pertains to a method for removing deposits of uranium compounds in uranium hexafluoride handling equipment. A fluorocarbon containing bromine is internally injected into the handling equipment at or below ambient pressure and this brominating agent removes uranium compounds which have been formed therein. A fluoridating agent is also preferably used in conjunction with the fluorocarbon containing bromine.

9 Claims, No Drawings

METHOD FOR REMOVING URANIUM-CONTAINING DEPOSITS IN URANIUM HEXAFLUORIDE PROCESSING EQUIPMENT

This invention relates to a method for removing deposits of uranium compounds in uranium hexafluoride handling equipment.

The deposits are usually comprised of uranium hexafluoride hydrolysis or reduction products and may form as adherent or powdery deposits.

In such equipment, especially where it forms part of uranium 235 enrichment plants, such deposits may be the cause of costly disruptions to normal operations.

To remove such deposits, the practice has been to treat the equipment affected with iodine heptafluoride as described in printed German patent specification DE-AS No. 25 04 840. This method is effective when the deposits consist of $UF_6$ reduction products, such as $UF_5$, $U_2F_9$ or $UF_4$, only. However, when the deposits comprise $UF_6$ hydrolysis products, such as uranyl fluoride $UO_2F_2$ and its hydrates, removal of these deposits with $IF_7$ wil be less than complete.

In a broad aspect, the present invention provides a method which is as technically simple to effect as that described in printed German patent specification DE-AS No. 25 04 840; minimizes corrosion of the equipment; and excludes the risk of explosion while additionally removing deposits consisting of $UF_6$ hydrolysis products and other uranium compounds containing oxygen.

The present invention provides a method by which the deposits are removed at room temperature or above by the action of the reaction products formed by converting brominating agent with at least one fluorinating agent added in excess.

As a brominating agent, any fluorocarbon containing bromine can be used. Particularly preferred are bromofluoromethanes such as bromotrifluoromethane ($CBrF_3$) and dibromodifluoromethane ($CBr_2F_2$). As fluorinating agent, a variety of compounds can be employed but the preferred are iodine heptafluoride ($IF_7$) and fluorine ($F_2$). Of couse, mixtures of both types of compounds can be used. It will be understood that the conditions apply equally to the use of bromine trifluoride as fluorinating agent.

PREFERRED EMBODIMENTS

The reacting mixture of the brominating agent and the fluorinating agent can be formed optionally in the equipment proper by injecting the components, or in a reactor separate from the equipment for injection into the processing equipment. The reaction mixture can be injected at a total pressure as high as 130 mbar. It is also advantageous to circulate the reaction mixture continuously in the equipment to be treated.

Fluorination of the brominating agent will produce brominetrifluoride $BrF_3$ in the equipment, e.g., $$CBrF_3 + 2IF_7 \rightarrow BrF_3 + CF_4 + 2IF_5 \qquad (Ia)$$

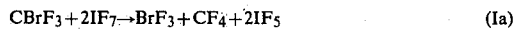

$$CBrF_3 + 2F_2 \rightarrow BrF_3 + CF_4 \qquad (Ib)$$

The brominating compound is advantageously injected at a partial pressure such that the bromotrifluoride ($BrF_3$) forms as a liquid to produce a film on the walls of the equipment. Liquid $BrF_3$ will react with oxides and oxyfluorides much faster than gaseous $BrF_3$ (vapor pressure of $BrF_3$: only 9 mbar at 20° C.) while eliminating oxygen and forming nascent bromine:

$$4\ BrF_{3\ liq.} + 3[UO_2F_2] \rightarrow 4\ (Br) + 3UF_6 + 3O_2 \qquad (II)$$

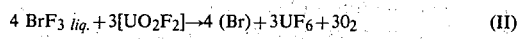

The formation of bromine, which has an exceedingly corrosive effect on metals, is effectively minimized if not entirely precluded by the use of excess fluorinating agent in the original reaction mixture:

$$4\ (Br) + 6IF_7 \rightarrow 4\ BrF_3 + 6IF_5 \qquad (IIIa)$$

$$4\ (Br) + 6F_2 \rightarrow 4\ BrF_3 \qquad (IIIb)$$

This reaction, of course, provides additional bromine trifluoride but some $BrF_3$ will be fluorinated by formation of ineffective bromine pentafluoride:

$$BrF_3 + IF_7 \rightarrow BrF_5 + IF_5 \qquad (IVa)$$

$$BrF_3 + F_2 \rightarrow BrF_5 \qquad (IVb)$$

The reactions (IVa) and (IVb) will proceed but very slowly in the gaseous phase.

For each mole of $BrF_3$ that reacts, there is produced one nascent bromine. Therefore, the excess fluorinating agent should be sufficient to react with the nascent bromine. Accordingly, the excess fluorinating agent should be present in an amount at least equivalent to the amounts of nascent bromine produced and usually in slight excess.

The hydrate water of $UO_2F_2$ and other deposits will be converted in accordance with $$2\ BrF_3 + 3\ H_2O \rightarrow 2(Br) + 6\ HF + 1.5\ O_2 \qquad (V)$$

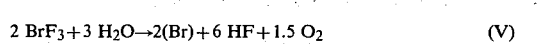

Bromine formed will be fluorinated in accordance wth (IIIa, b).

Removal of the deposits will normally set in after a brief peirod of incubation to be completed in a matter of, normally, a few hours. An explosive formation of $BrF_3$ expected to occur when uranium fluorides and uranium oxide fluorides react with a $CBrF_3$-$F_2$ mixture can be prevented by selecting a suitable $CBrF_3$ partial pressure and $CBrF_3$-$F_2$ mixing ration. The resulting products are volatile; have little, if any, corrosive effect; and contain no dangerous substances.

When $IF_7$ is used as a fluorinating agent, lower uranium fluorides ($UF_5$, $UF_4$, $U_2F_9$) will be removed simultaneously as described in printed German patent specification DE-AS No. 25 04 840. To remove deposits consisting of uranium oxide fluorides and lower uranium fluorides, $IF_7$ is preferred as a fluorinating agent. When the deposits consist mainly of uranium oxide fluorides, preferably fluorine ($F_2$) can be used as fluorinating agent. Lower uranium fluorides, if present, will then also be fluorinated, although their reaction times may be slower than with $IF_7$.

The rate of reaction of the uranium-containing deposits with the liquid $BrF_3$ film produced in accordance with this method is faster than that of $ClF_3$ gas (printed German patent specification DE-AS No. 15 17 638).

The reaction rate can be varied by adding inert gases, such as $N_2$ or He.

The advantages afforded by the method are that the need for dismantling the equipment is eliminated; cleaning is faster; the reaction products generated are gaseous only; corrosion on plant equipment is practically prevented; and the risk involved in the work with chlorine trifluoride is eliminated. The cost of cleaning and that of eliminating radioactive waste are both minimized. The deposits carrying uranium are fluorinated into gaseous $UF_6$, which keeps nuclear fuel losses at a minimum. The method is therefore ideally suited for removing uranium from shut-down equipment and machines in the nuclear fuel circuit. The gaseous products will be separated by distilling or by fractional freezing.

A number of examples are shown below in illustration of the present invention:

EXAMPLE 1

0.67 g (2 1 mMol) of $\beta$-$UF_5$ were dusted by photochemical decomposition of a $UF_6$-$H_2$ mixture onto the walls of a 1-liter stainless vessel having a sapphire window. Following removal of the non-decomposed portion of the $UF_6$-$H_2$ and of the HF, about half of the $\beta$-$UF_5$ is hydrolyzed with humid air

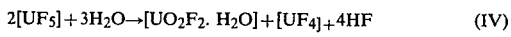
$$2[UF_5] + 3H_2O \rightarrow [UO_2F_2 \cdot H_2O] + [UF_4] + 4HF \quad (IV)$$

This produces uranyl fluoridehydrate and uranium tetrafluoride.

Injection of 40 mbar $CBrF_3$ (1.1 mMol) and subsequent admixing of 400 mbar $IF_7$ (11 mMol) then converts all solid deposits into gaseous substances within a matter of about 10 to 30 minutes. The chemical mechanism of removal of these deposits is expressed in equations Ia, II, IIIc and V. Fluorination additionally takes place of $UF_4$ and $UF_5$ by means of $IF_7$ to $UF_6$. The resultant mixture was then processed and very nearly 2 mMol uranium hexafluoride were isolated.

EXAMPLE 2

A. 6.85 g. (0.05 Mol) $BrF_3$, and subsequently 19 g. (0.5 Mol) $F_2$ were added to 70.4 g. (0.2 Mol) $UO_2F_2$. The reaction vessel (holding 5 liters) was water-cooled. After 1 to 2 hours the solid $UO_2F_2$ has disappeared and 67 g. (0.2 Mol) of $UF_6$ were isolated. The chemical mechanism of $UO_2F_2$ removal is expressed in equations (II) and (IIIb) which are combined to the summary reaction:

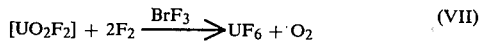
$$[UO_2F_2] + 2F_2 \xrightarrow{BrF_3} UF_6 + O_2 \quad (VII)$$

The reaction (VII) takes place at room temperature because of the apparently catalytic effect of the liquid $BrF_3$, whereas direct fluorination of $UO_2F_2$ with elementary fluorine will not succeed at a useful rate unless above 340° C. B. 7.45 g. (0.05 Mol) $CF_3Br$, and thereafter 19 g. (0.5 Mol) fluorine were added to 70.4 g. (0.2 Mol) of $UO_2F_2$ in a reaction vessel of 5 liters. After 1 to 2 hours the $UO_2F_2$ was fluorinated into volatile $UF_6$ (67 g. equivalent to 0.2 Mol).

The corresponding chemical mechanisms are expressed in equations (Ib), (II) and (IIIb).

EXAMPLE 3

The experiment was set up by injecting 200 mbar $CBrF_3$ and thereafter 800 mbar $F_2$ into a 4-liter stainless-steel vessel. The mixture was allowed to stand several days at room temperature, during which time the pressure was observed and gas samples were analyzed occasionally by IR spectrometry. In the course of one week the $CF_4$ signal was noted to rise to a level indicative of a 10% conversion between $CBrF_3$ and $F_2$. 90% of the $CBrF_3$ had not been converted. Apart from $CF_4$, $BrF_5$ was formed.

This result shows that $CBrF_3$ does not react with $F_2$ in a considerable extent, so that these compounds can be mixed in a separate container and subsequently be injected into the evacuated equipment containing the deposits of uranium compounds.

The chemical mechanism of these first reactions is described by equations Ib and IVb. 130 mbar of the premixed $CBrF_3$-$F_2$ mixture (Mol ratio 1:4 equivalent to 8 mMol $CBrF_3$ and 32 mMol $F_2$ was then injected into an approximately 5-liter, evacuated device the walls of which were covered with a coating of uranium compounds (uranium oxide fluoride and lower uranium fluoride), which were clearly apparent through a sapphire observation window. After about 15 minutes the development of $BrF_3$ was indicated by a drop in the pressure of the mixture, and IR spectrometric analysis showed the absence of $CF_4$ and $CBrF_3$. After about 20 hours the sapphire window was completely clear, and IR spectrometric analysis evidenced about 2 mbar $UF_6$ (about 1.7 mMol).

The reactions taking place in the process are described by equations Ib, II, IIIb and IVb.

What is claimed is:

1. A method of removing firmly adherent or powdery deposits in uranium hexafluoride handling equipment, wherein the deposits are eliminated at or above room temperature and at or below ambient pressure by the action of reaction products formed by the conversion of a fluorocarbon containing bromine with at least one fluorinating agent added in excess and applying the reaction products internally to said handling equipment.

2. The method according to claim 1, wherein said fluorocarbon containing bromine is bromotrifluoromethane $CBrF_3$, and said fluorinating agent, is elementary fluorine.

3. The method according to claim 2, wherein said fluorinating agent is iodine heptafluoride.

4. The method according to claim 1, wherein said fluorocarbon containing bromine is dibromodifluoromethane $CBr_2F_2$ or other volatile compound containing bromine.

5. The method according to claim 1, wherein said fluorocarbon containing bromine is injected internally into the handling equipment at a partial pressure such that the reaction product bromine trifluoride is substantially in a liquid state.

6. The method according to claim 1, wherein the reaction mixture of said fluorocarbon containing bromine and said fluorinating agent or agents is formed either directly in the equipment by injecting the mixing components therein, or is formed outside the equipment in a separate container, said mixture subsequently injected into the evacuated equipment.

7. The method according to claim 1, the reaction mixture is injected at a total pressure as high as 130 mbar.

8. The method according to claim 1, the reaction mixture is circulated continuously in the equipment to be treated.

9. The method according to claim 1, an inert gas is added to the reaction mixture.

* * * * *

UNITED STATES PATENT AND TRADEMARK OFFICE
CERTIFICATE OF CORRECTION

PATENT NO. : 4,311,678

DATED : January 19, 1982

INVENTOR(S) : Dr. Eberhard Jacob et al.

It is certified that error appears in the above—identified patent and that said Letters Patent are hereby corrected as shown below:

Column 3, line 14,: "(2 1 mMol)" should be

-- (2mMol) --

Signed and Sealed this

Thirtieth Day of March 1982

[SEAL]

Attest:

GERALD J. MOSSINGHOFF

*Attesting Officer*   *Commissioner of Patents and Trademarks*